United States Patent

Depoorter et al.

[15] 3,656,958

[45] Apr. 18, 1972

[54] SILVER HALIDE EMULSIONS CONTAINING CARBOXY-ALKYL THIAZOLE OR SELENAZOLE RHODANINE MEROCYANINE SENSITIZING DYES

[72] Inventors: Henri Depoorter, Mortsel, Belgium; Oskar Riester, Leverkusen, Germany

[73] Assignee: Gevaert-AGFA N.V., Mortsel, Belgium

[22] Filed: Mar. 23, 1970

[21] Appl. No.: 22,006

[30] Foreign Application Priority Data

Apr. 10, 1970 Great Britain.....................18,508/69

[52] U.S. Cl............................................96/139, 260/240.4
[51] Int. Cl.............................................................G03c 1/08
[58] Field of Search.................................96/139, 140, 142

[56] References Cited

UNITED STATES PATENTS

| | | | |
|---|---|---|---|
| 2,519,001 | 8/1950 | Sprague | 96/139 |
| 2,493,748 | 1/1950 | Brooker et al. | 96/139 |
| 3,385,707 | 5/1968 | Riester et al. | 96/139 |
| 3,288,610 | 11/1966 | Gotze et al. | 96/140 |

Primary Examiner—J. Travis Brown
Attorney—Brufsky, Staas, Breiner and Halsey

[57] ABSTRACT

Thiazole and selenazole rhodanine merocyanine dyes are provided which comprise in the 4,5-positions of the thiazole or selenazole nucleus at least one carboxy-substituted alkyl or aralkyl group, a 4,5-carboxy-alkylene or 4,5- carboxyalkyl-alkylene group or a fused-on arylene nucleus carrying a carboxy-substituted alkyl or aralkyl group, the carboxy group being either in its free acid form or in its salt form. These dyes in photographic silver halide emulsions provide superior sensitizing action in the blue region of the spectrum so that they are extremely suitable for increasing the blue-sensitivity of silver halide emulsions. Their sensitizing action is not adversely affected by the presence of color couplers, which makes them especially suitable for sensitizing the blue-sensitive layer of light-sensitive papers used in color photography.

6 Claims, No Drawings

SILVER HALIDE EMULSIONS CONTAINING CARBOXYALKYL THIAZOLE OR SELENAZOLE RHODANINE MEROCYANINE SENSITIZING DYES

The present invention relates to novel merocyanine dyes, to the preparation thereof, to their use as spectral sensitizers for light-sensitive elements, more particularly silver halide emulsion layers, and to light-sensitive elements sensitized therewith.

In accordance with the present invention novel thiazole and selenazole rhodanine merocyanine dyes are provided which comprise in the 4,5-positions of the thiazole or selenazole nucleus at least one carboxy-substituted alkyl or aralkyl group, a 4,5-carboxyalkylene or 4,5-carboxyalkyl-alkylene group or a fused-on arylene nucleus carrying a carboxy-substituted alkyl or aralkyl group, the carboxy group being either in its free acid form or in its salt form.

The present invention provides in particular novel merocyanine dyes which correspond to the following general formula I:

(I)
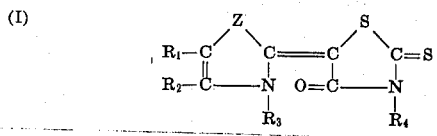

wherein:

Z stands for sulphur or selenium, each of $R_3$ and $R_4$ stands for a substituent of the type known in cyanine dyes for example an alkyl group such as methyl, ethyl, propyl, isopropyl, butyl, isobutyl, a substituted alkyl group such as β-hydroxyethyl, β-acetoxyethyl, carboxymethyl and carboxyethyl as described in the German Pat. specification 704,141, sulphoalkyl as described in the United Kingdom Pat. specification 742,112 such as sulphoethyl, sulphopropyl, sulphobutyl, sulphatoalkyl as described in the French Pat. specification 1,149,769 such as sulphatopropyl and sulphatobutyl, the group —A—CO—O—B—SO$_2$—OH wherein A and B have the same significance as set forth in United Kingdom Pat. specification 886,271 such as a sulphocarbomethoxy-methyl group, a ω-sulphocarbopropoxy methyl group, a ω-sulphocarbobutoxy-methyl group, a p-(ω-sulphocarbobutoxy)-benzyl group, the group —A—W—NH—V—B wherein A, W, V and B have the same significance as set forth in United Kingdom Pat. specification 904,332 such as a N-(methylsulphonyl) carbamyl-methyl group, γ-(acetylsulphamyl)-propyl, a δ-(acetylsulphamyl)-butyl group, the group

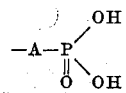

wherein A has the same significance as described in the United Kingdom Pat. specification 886,270, an allyl group, an aralkyl group e.g. a benzyl group, a substituted aralkyl group such as carboxybenzyl and sulphobenzyl, an aryl group such as phenyl, a substituted aryl group such as carboxyphenyl, or a cycloalkyl group such as cyclohexyl, and each of $R_1$ and $R_2$ stands for hydrogen or a substituent for example alkyl including substituted alkyl, aralkyl including substituted aralkyl, aryl including substituted aryl, acyl, halogen, amino, substituted amino, e.g. dialkylamino, alkoxycarbonyl and alkylthio, at least one of $R_1$ and $R_2$ being an alkyl or aralkyl group substituted by carboxyl in its free acid form or in salt form, or $R_1$ and $R_2$ together represent an alkylene group substituted by carboxyl or carboxyalkyl in its free acid form or in salt form or together represent the atoms necessary to close a fused-on arylene nucleus such as a benzene or naphthalene nucleus substituted by an alkyl or aralkyl group comprising a carboxyl group in its free acid form or in salt form.

The merocyanine dyes according to the above general formula have an excellent sensitizing action in the blue region of the spectrum so that they are very suitable for increasing the blue-sensitivity of silver chloride or silver chloro-bromide emulsions. Their sensitizing action is not adversely affected by the presence of colour couplers, which makes them especially suitable for sensitizing the blue-sensitive layer of light-sensitive papers of use in colour photography.

Moreover, the merocyanine dyes according to the present invention leave no residual stain in the photographic material after processing and do not enhance the fog as is the case with the basic cyanine dye salts. They are not influenced by other emulsion additives such as hardeners, stabilizers, wetting agents, etc. and keep their sensitizing activity under conditions of increased temperature and relative humidity.

Representative examples of merocyanine dyes corresponding to the above general formula are:

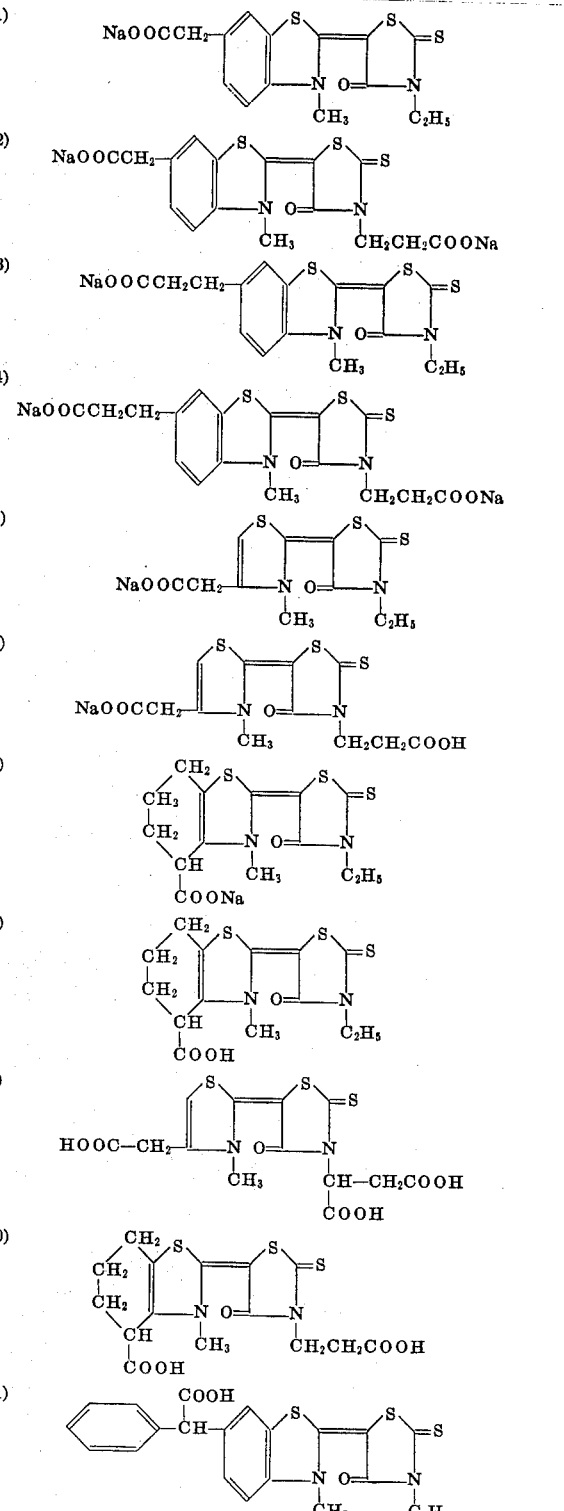

The merocyanine dyes according to the present invention can be prepared by methods known to those skilled in the art e.g. by condensing a cyclammonium compound represented by the general formula II:

(II) 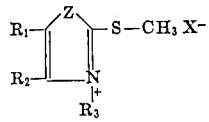

wherein $R_1$, $R_2$, $R_3$ and $Z$ have the same significance as set forth above, and $X$ stands for an anion or may be not present when $R_1$, $R_2$ or $R_3$ contain an anionic group, with a rhodanine compound corresponding to the formula:

(III) 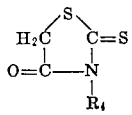

wherein $R_4$ has the same significance as set forth above.

The quaternary dye intermediates represented by general formula II are prepared starting from compounds corresponding to the formula:

(IV) 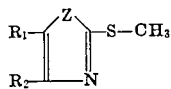

wherein $R_1$, $R_2$ and $Z$ have the same significance as above.

The following illustrates the preparation of compounds according to formula IV.

Preparation 1.

2-methylthio-6-carboxymethylbenzothiazole having the following formula:

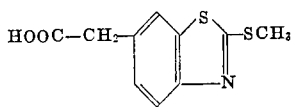

was prepared according to the following steps.
a. 2-amino-6-carboxymethylbenzothiazole 60 g of 4-aminophenylacetic acid was dissolved in 40 ml of concentrated hydrochloric acid and 240 ml of water. The solution was stirred at 50° C. whereupon a solution of 242.5 g of potassium thiocyanate in 200 ml of water was added dropwise in 1 hour. The mixture was kept at 50° C. and after 15 min. a solution of 170 g of copper sulphate (pentahydrate) in 600 ml of water was added in 1 hour. After 15 min., the temperature was raised to 80° C. and kept at this value for 15 min. The reaction mixture was filtered with suction whilst hot. The filter cake was extracted once with 500 ml of hot water and once with 300 ml of hot water. The collected filtrates were cooled and the pH thereof was adjusted to 5 by means of sodium carbonate. Sodium acetate was added until no solid precipitated anymore. The precipitate was filtered by suction, washed with water and dried.

Yield: 54.5 g.
Melting point: > 300° C.
b. 3-mercapto-4-aminophenylacetic acid.

22.5 g of 2-amino-6-carboxymethylbenzothiazole, 24 g of potassium hydroxide and 50 ml of water were heated for 6 h at 200° C. in a closed vessel. The mixture was cooled and the pH was adjusted to 7 by means of 5 N hydrochloric acid and then cautiously adjusted to 4 by means of 2 N hydrochloric acid. The precipitate formed was filtered by suction, washed with water and dried.

Yield: 15.4 g.
Melting point: 152° C.
c. 2-mercapto-6-carboxymethylbenzothiazole 15.4 g of 3-mercapto-4-aminophenylacetic acid in 75 ml of ethanol was brought into solution by addition of 7 g of sodium hydroxide in 75 ml of water. The mixture was cooled below 35° C. and 15.4 ml of carbon disulphide was added whereupon the mixture was refluxed for 6 hours. The ethanol was distilled off and the pH of the residue was adjusted to 4 by addition of 2 N hydrochloric acid. The product was collected by filtration, washed with water and dried.

Yield: 18 g of a product with melting point of 260° C. (decomposition) which could be used as such for the preparation of the 2-methylthio derivative.

A sample with melting point of 270° C. (decomposition) which was found to be for 98.4 percent pure by potentiometric titration of the carboxyl and the mercapto group, was obtained by recrystallisation from ethanol.
d. 2-methylthio-6-carboxymethylbenzothiazole.

To a solution of 22.5 g of 2-mercapto-6-carboxymethylbenzothiazole in 16 g of sodium hydroxide and 160 ml of water, 13.7 ml of dimethylsulphate was added whereupon the mixture was heated on a boiling waterbath for 1 h. The mixture was cooled and the pH was adjusted to 4 by means of 2 N hydrochloric acid. The precipitate formed was filtered by suction, washed with water and dried.

Yield: 17 g.
Melting point: 166° C.

In the NMR spectrum of the sample with melting point 168° C, obtained after two recrystallisations from ethanol, the methylthio signal was found to be 101 against an internal standard.

Preparation 2

2-methylthio-6(2-carboxyethyl)benzothiazole having the following formula:

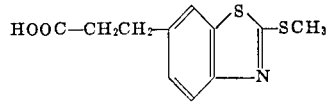

was prepared according to the following steps.
a. β-(4-aminophenyl)-propionic acid.

57 g of 4-nitrocinnamic acid was hydrogenated in 450 ml of 2-methoxyethanol using Raney nickel as a catalyst at a temperature of 75°–80° C. and a hydrogen pressure of 1,500 psi.

Yield: 47.5 g.
Melting point: 133° C.
b. 2-amino-6-(2-carboxyethyl)benzothiazole.

This compound was prepared in an analogous way as 2-amino-6-carboxymethylbenzothiazole (preparation 1a) starting from 45 g of β-(4-amino-phenyl)propionic acid.

Yield: 42 g of a product with melting point 250° C. that could be used as such for the preparation of β-(3-mercapto-4-aminophenyl)propionic acid. An analytical sample had a melting point of 263° C.

c. β-(3-mercapto-4-aminophenyl)propionic acid

This compound was prepared in an analogous way as 3-mercapto-4-aminophenylacetic acid (preparation 1b) starting from 40 g of 2-amino-6-(2carboxyethyl)benzothiazole.

Yield: 28 g.
Melting point: 112° C.

d. 2-mercapto-6-(2-carboxyethyl)benzothiazole.

This compound was prepared in an analogous way as 2-mercapto-6-carboxymethylbenzothiazole (preparation 1c) starting from 27.8 g of β-(3-mercapto-4-aminophenyl) propionic acid.

Yield: 33 g.
e. 2-methylthio-6(2-carboxyethyl)benzothiazole.

This compound was prepared in an analogous way as 2-methylthio-6-carboxymethylbenzothiazole (preparation 1d) starting from 6.6 g of 2-mercapto-6(2-carboxyethyl) benzothiazole. The crude product was dissolved in hot benzene and filtered to remove some unreacted product. Upon cooling, 3.5 g of the desired pure product with melting point 132° C. crystallised. The NMR spectrum corresponded to the given structure.

Preparation 3

2-methylthio-4-carboxymethylthiazole having the following formula:

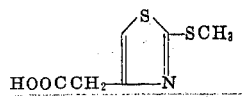

was prepared as follows.

To a solution of 40.6 g of 2-mercapto-4-ethoxy-carbonyl-methyl-thiazole (J.Am.Chem.Soc. 77, 476(1955)) in 20 g of sodium hydroxide and 215 ml of water, 30 ml of dimethyl sulphate was added dropwise whereupon the mixture was heated on a boiling waterbath for 75 min. The mixture was cooled whereupon the pH was adjusted to 4 by means of 2N hydrochloric acid. The precipitate was collected by filtration, washed with water and dried.

Yield: 25.5 g.
Melting point: 125° C.

The NMR spectrum was completely compatible with the given structure.

Preparation 4

2-methylthio-4-carboxy-4,5,6,7-tetrahydrobenzothiazole having the following formula:

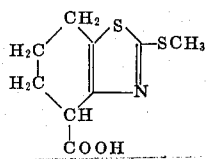

was prepared according to the following steps.

a. 2-bromo-6-ethoxycarbonylcyclohexanone.

To 150 g of 2-ethoxycarbonylcyclohexanone in 50 ml of dry ether, cooled in a bath of ice and salt, 45 ml of bromine was added dropwise with stirring in 75 min. After 45 min., 50 ml of ether was added whereupon the mixture was poured into 97 g of sodium carbonate and ice. The organic layer was separated and the aqueous layer was extracted twice with 50 ml of ether. The combined ether extracts were washed with 50 ml of water, dried over sodium carbonate and fractionated. The fraction boiling at 121°–126° C./2.5 mm Hg was collected.

Yield: 174 g.

b. 2-mercapto-4-ethoxycarbonyl-4,5,6,7-tetrahydrobenzothiazole.

To a mixture of 44 g of ammonium dithiocarbamate and 400 ml of ethanol, 99.6 g of 2-bromo-6-ethoxycarbonyl-cyclohexane was added dropwise with stirring whereby the temperature rose to about 35° C. Stirring was continued for 3½ hours at room temperature whereupon the ammonium bromide formed was filtered off and the filtrate concentrated by evaporation to about 100 ml. After addition of 50 ml of water the mixture was kept overnight in a refrigerator. The crystalline product formed was filtered by suction, washed twice with 30 ml of water and once with 25 ml of hexane and then dried.

Yield: 78.5 g.
Melting point: 119°–120° C.

c. 2-methylthio-4-carboxy-4,5,6,7-tetrahydrobenzothiazole.

This compound was prepared in an analogous way as 2-methylthio-4-carboxymethylthiazole (preparation 3) starting from 78.5 g of 2-mercapto-4-ethoxycarbonyl-4,5,6,7-tetrahydrobenzothiazole. The product obtained was purified by recrystallization from acetone.

Yield: 30.3 g.
Melting point: 119° C.

By a NMR spectrum of an analytical sample (melting point 121° C.) obtained by recrystallisation from acetonitrile followed by recrystallisation from benzene/hexane it was proved that the compound had the structure given.

Preparation 5

2-methylthio-6-(phenylcarboxymethyl) benzothiazole having the following formula:

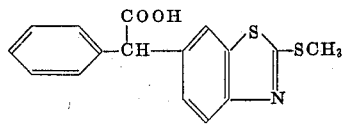

was prepared according to the following steps.

a. Phenyl-4-aminophenylacetonitrile 76.5 g of phenyl-4-nitrophenylacetonitrile (J.Am.Chem. Soc. 77, 476 (1955) diluted with dioxane to a volume of 300 ml was hydrogenated, using Raney nickel as catalyst, at a temperature of 20°–40° C. and a hydrogen pressure of 1200–1500 psi.

Yield: 63 g.

b. 2-amino-6(phenylcyanomethyl)benzothiazole

A solution of 63 g of phenyl-4-aminophenylacetonitrile in 30 ml of concentrated hydrochloric acid and 180 nl of water was stirred at 50° C. A solution of 180 g of potassium thiocyanate in 140 ml of water was added dropwise followed after 15 min. by addition of a solution of 147 g of copper sulphate (pentahydrate) in 490 ml of water. After 30 min. the temperature was raised to 80° C. and the mixture was kept at this temperature for 4 hours. The supernatant liquid was decanted leaving a sticky precipitate. The precipitate was treated with 500 ml of acetone and the undissolved copper salts were filtered off. The mixture was diluted with 500 ml of water and its pH was adjusted to 8 by means of sodium carbonate. The acetone was distilled off and the product was collected by filtration and recrystallised from acetonitrile.

Yield: 11 g.
Melting point: 185° C.

c. phenyl-(3-mercapto-4-aminophenyl)acetic acid.

This compound was prepared in an analogous way as 3-mercapto-4-amino-phenylacetic acid (preparation 1b) starting from 11 g of 2-amino-6-(phenylcyanomethyl) benzothiazole.

Yield: 6 g.
Melting point: 157° C.

d. 2-mercapto-6-(phenylcarboxymethyl)benzothiazole.

This compound was prepared in an analogous way as 2-mercapto-6-carboxymethylbenzothiazole (preparation 1c) starting from 6 g of phenyl(3-mercapto-4-aminophenyl) acetic acid.

Yield: 5.4 g e. 2-methylthio-6-(phenylcarboxymethyl)benzothiazole.

This compound was prepared in an analogous way as 2-methylthio-6-carboxymethylbenzothiazole (preparation 1d) starting from 5.4 g of 2-mercapto-6-(phenylcarboxymethyl)benzothiazole.

Yield: 4.3 g.

It was proved by a NMR spectrum that the compound had the structure given.

The following preparations illustrate how the merocyanines according to the present invention can be prepared.

Preparation 6

The merocyanine dye 3 was prepared as follows:

2.6 g of 2-methylthio-6-(2-carboxyethyl)benzothiazole was quaternized by means of 2 ml of dimethyl sulphate by heating for 30 min. on an oil bath at 110°–120° C. The quaternary salt obtained was washed with ether and dissolved in 25 ml of absolute ethanol. After addition of 1.6 g of 3-ethylrhodanine and 3 ml of triethylamine, the mixture was kept for 2 h at room temperature. The dye formed was collected by filtration, washed with ethanol and suspended in a refluxing mixture of 500 ml of ethanol and 2.5 ml of 2N sodium hydroxide. The treatment with aqueous sodium hydroxide served to hydrolyse the ester group that was partly formed during quaternization of the base. Water was added until a solution was obtained whereupon the dye crystallised upon cooling. The dye was filtered by suction and washed with ethanol.

Yield: 2.5 g.

The merocyanine dyes 1, 2, 4, 5, 7 were prepared in a similar way.

Preparation 7

The merocyanine dye 8 was prepared as follows. 2 g of dye 7 was dissolved in a refluxing mixture of 25 ml of ethanol and enough water to obtain a clear solution. 15 ml of 2N hydrochloric acid was added and after cooling, the dye formed was filtered off and washed with water.

Yield: 1.8 g.

The dyes 9, 10 and 11 were prepared in a similar way.

The absorption characteristics of the dyes of the above formulae are listed in the following table.

| Dye | Absorption maximum nm | $\epsilon \cdot 10^{-4}$ | Measured in |
|---|---|---|---|
| 1 | 436 | 3.7 | water |
| 2 | 436 | 5.4 | water |
| 3 | 435 | 5.5 | water |
| 4 | 438 | 5.3 | water |
| 5 | 430 | 4.0 | water |
| 6 | 440 | 3.3 | methanol |
| 8 | 435 | 4.4 | methanol |
| 9 | 428 | 3.5 | water |
| 10 | 435 | 3.7 | methanol |
| 11 | 432 | 5.6 | methanol |

In accordance with the present invention photographic materials are provided comprising light-sensitive silver halide emulsion layers containing a merocyanine dye as defined above.

The hydrophilic colloid used as the vehicle for the silver halide may be any of the common hydrophilic colloids employed in photographic light-sensitive emulsions, for example gelatin, agar-agar, albumin, zein, casein, collodion, alginic acid, water-soluble cellulose derivatives such as carboxymethyl cellulose, polyvinyl alcohol, poly-N-vinyl pyrrolidone or other hydrophilic synthetic or natural resins or polymeric compounds, gelatin being however favoured. If desired, compatible mixtures of two or more colloids may be employed for dispersing the silver halide.

Various silver salts may be used as the light-sensitive salt such as silver chloride, silver bromide, silver iodide or mixed silver halides such as silver chlorobromide, silver bromoiodide and silver chlorobromoiodide.

The sensitizing dyes of use according to the invention can be incorporated at any stage of emulsion preparation and should be uniformly distributed throughout the emulsion. They are preferably incorporated after the chemical ripening and just before coating.

The methods of incorporating the dyes in the emulsion are simple and well known to those skilled in the art of emulsion making. They are generally added to the emulsion in the form of a solution in a suitable solvent e.g. water or an alcohol such as methanol, or a mixture of an alcohol and water. The solvent must of course be compatible with the emulsion and substantially free from any deleterious effect on the light-sensitive materials.

The concentration in the emulsion of the sensitizing dyes corresponding to the above general formula can vary between wide limits, for example from 10 to 200, preferably from 30 to 100 mg per mole of silver halide. The most suitable and most economical concentration for any given emulsion will be apparent to those skilled in the art of emulsion making.

The dyes are preferably incorporated into photographic emulsions the general sensitivity of which has been increased by chemical ripening. These emulsions may be chemically sensitized by effecting the ripening in the presence of small amounts of sulphur containing compounds such as allyl isothiocyanate, allyl thiourea, sodium thiosulphate, etc. The emulsions may also be sensitized by means of reducing imino-aminomethane-sulphinic sensitizers such as tin compounds, acids and the derivatives thereof, cadmium salts, and the salts of noble metals such as gold, platinum, palladium, iridium, ruthenium and rhodium.

The photographic emulsions containing the sensitizing dyes according to the invention can also contain such addenda as antifoggants, stabilizers, colour couplers, development accelerators, plasticizers, wetting agents and hardeners.

Suitable hardening agents are amongst others formaldehyde, chrome alum, halogen-substituted aldehydes comprising a carboxyl group such as mucobromic acid, diketones, dialdehydes, etc.

Compounds suitable for sensitizing the emulsions by development acceleration are e.g. compounds of the polyoxyalkylene type such as alkylene oxide condensation products as described amongst others in U.S. Pat. Nos. 2,531,832, and 2,533,990, in United Kingdom Pat. specifications 920,637, 940,051, 945,340 and 991,608 and in Belgian Pat. specification 648,710 as well as onium derivatives of amino-N-oxides as described in United Kingdom Pat. specification 1,121,696.

Among the stabilizers customarily employed in emulsion may be mentioned mercury compounds such as the mercury compounds described in Belgian Pat. specifications 524,121, 677,337 and 707,386, U.S. Pat. No. 3,179,520, heterocyclic nitrogen containing thioxo compounds such as those described in German Pat. specification 1,151,731, benzothiazoline-2-thione and 1-phenyl-2-tetrazoline-5-thione and compounds of the hydroxytriazolopyrimidine type such as 5-methyl-7-hydroxy-s-triazolo[1,5]pyrimidine.

The emulsions sensitized in accordance with the present invention may be coated on a wide variety of photographic emulsion supports. Typical supports include cellulose ester film, polyvinyl acetal film, polystyrene film, polyethylene terephthalate film and related films of resinous materials as well as paper and glass.

The following examples illustrate the present invention.

Example 1

To 1 kg portions of an emulsion containing 0.3 mole of silver chloride per kg, 0.075 millimole of one of the spectral sensitizers listed in the table below was added.

The emulsions were coated on a conventional support and dried.

The relative sensitivities obtained after exposure in a sensitometer are listed in the table below.

| Dyestuff Formula | Relative Sens. | Sensitization maximum (nm) |
|---|---|---|
| — | 100 | (390) |
| 1 | 2240 | 470 |
| 2 | 2820 | 475 |
| 3 | 2240 | 470 |
| 4 | 1600 | 480 |
| 5 | 2600 | 465 |
| 6 | 2240 | 465 |
| 8 | 2820 | 485 |
| 9 | 1600 | 465 |
| 10 | 1350 | 480 |

Example 2

13.8 mg of the spectral sensitizer of formula 3, dissolved in water, was added to 448 g of a silver chlorobromoiodide emulsion that contains 72.5 mole percent of silver chloride, 27 mole percent of silver bromide and 0.5 mole percent of silver iodide and that was heated to 38° C.

After 30 minutes 130 ml of an aqueous solution containing 13 g of the yellow-forming color coupler of formula:

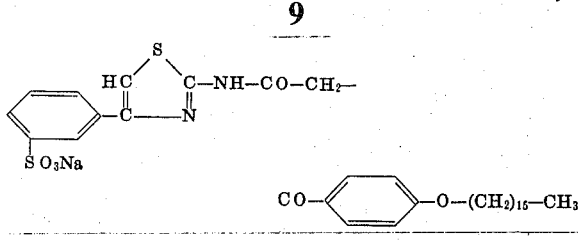

was added, whereupon after addition of hardener and wetting agents, the weight of the emulsion was brought to 1,300 g and the pH adjusted to 5.2.

After coating on a support and drying a blue sensitive layer for a conventional three-layer positive color material was obtained.

What we claim is:

1. A light-sensitive silver halide emulsion containing a thiazole or selenazole rhodanine merocyanine dye which comprises in the 4,5-positions of the thiazole or selenazole nucleus at least one carboxy-substituted alkyl or aralkyl group, a 4,5-carboxyalkylene or 4,5-carboxyalkyl-alkylene group or a fused-on arylene nucleus carrying a carboxy-substituted alkyl or aralkyl group, the carboxy group being either in its free acid form or in its salt form.

2. A light-sensitive silver halide emulsion according to claim 1, wherein said dye corresponds to the formula:

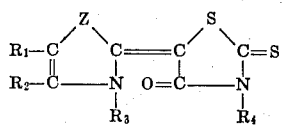

wherein:
Z stands for sulphur or selenium,
each of $R_3$ and $R_4$ stands for an alkyl group, an allyl group, a cycloalkyl group, an aralkyl group, or an aryl group, and
each of $R_1$ and $R_2$ stands for hydrogen or a substituent, at least one of $R_1$ and $R_2$ being an alkyl or aralkyl group substituted by carboxyl in its free acid form or in salt form,
or $R_1$ and $R_2$ together represent an alkylene group substituted by carboxyl or carboxyalkyl in its free acid form or in salt form,
or $R_1$ and $R_2$ together represent the atoms necessary to complete a fused-on arylene nucleus substituted by an alkyl or aralkyl group carrying a carboxy group in its free acid form or in salt form.

3. A light-sensitive silver halide emulsion according to claim 1, wherein said dye is present in an amount comprised between 10 and 200 mg per mole of silver halide.

4. A light-sensitive silver halide emulsion according to claim 1, wherein said emulsion also a color coupler for yellow.

5. A light-sensitive silver halide emulsion according to claim 1, wherein said emulsion is the blue-sensitive silver halide emulsion layer of a light-sensitive multi-layer material for the production of color images.

6. A light-sensitive silver halide emulsion according to claim 4 wherein said emulsion is the blue-sensitive silver halide emulsion layer of a light-sensitive multi-layer material for the production of color images.

* * * * *

UNITED STATES PATENT OFFICE
CERTIFICATE OF CORRECTION

Patent No. 3,656,958    Dated April 18, 1972

Inventor(s) Henri DEPOORTER ET AL

It is certified that error appears in the above-identified patent and that said Letters Patent are hereby corrected as shown below:

In the Heading, [30], the priority date should read -- Apr. 10, 1969 --.
Column 3, lines 5 - 10, the formula should appear as follows:

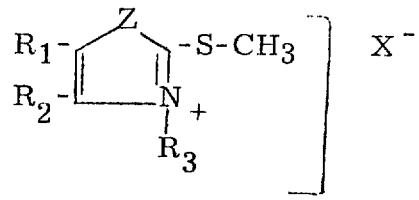

Column 3, line 12, "X" should read -- $X^-$ --. Column 8, lines 4 - 5, "imino-aminomethane-sulphinic sensitizers such as tin compounds," should read -- sensitizers such as tin compounds, imino-aminomethane-sulphinic --. Column 10, line 19, claim 4, after "also" insert -- contains --.

Signed and sealed this 27th day of November 1973.

(SEAL)
Attest:

EDWARD M. FLETCHER, JR.        RENE D. TEGTMEYER
Attesting Officer              Acting Commissioner of Patents